March 29, 1966  B. L. MILLER  3,243,754
SUPPORTING AND FEEDING SYSTEM FOR PENDANT FLUORESCENT
LIGHTING FIXTURES AND THE LIKE
Filed Feb. 17, 1965  2 Sheets-Sheet 1
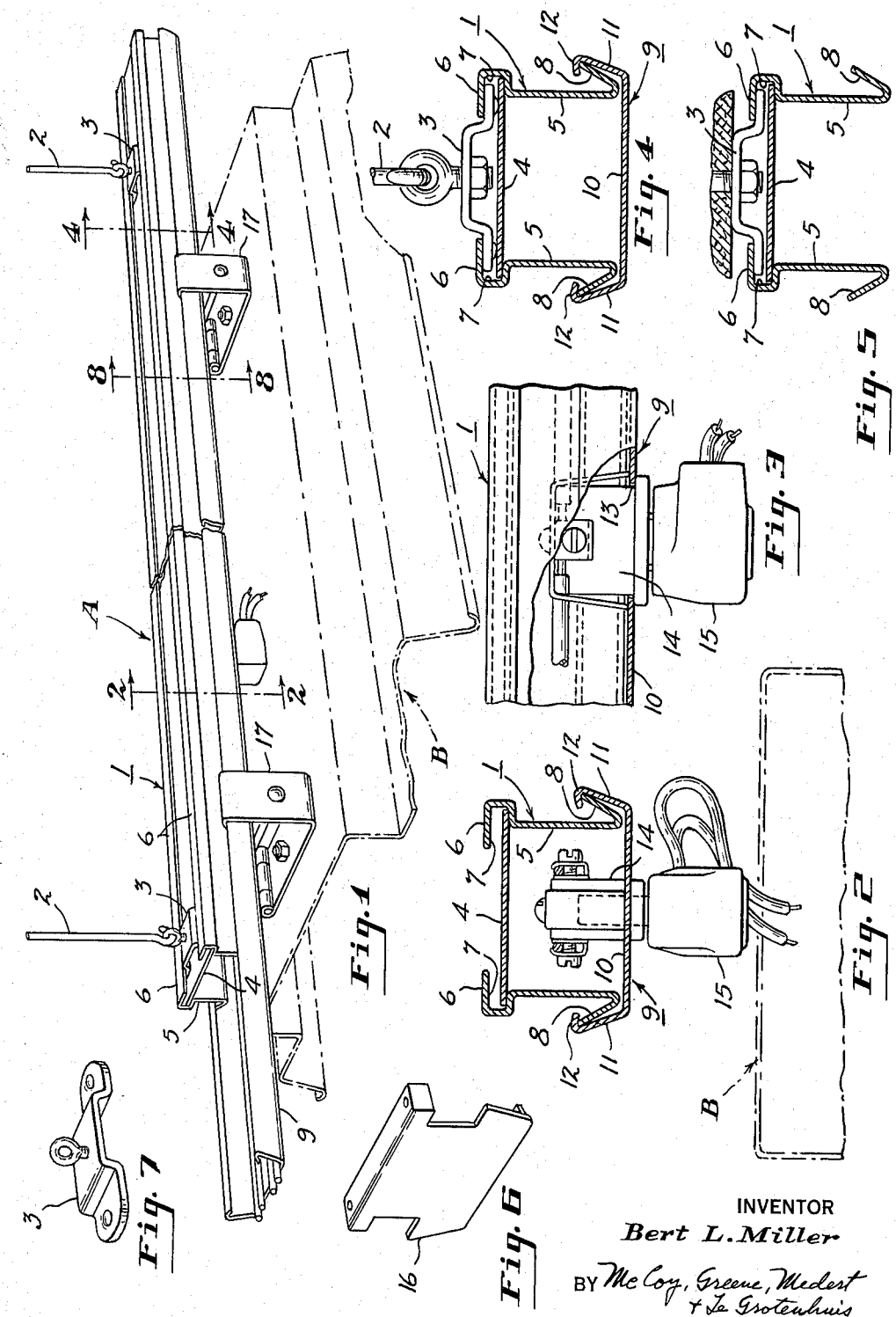
INVENTOR
*Bert L. Miller*
BY McCoy, Greene, Medert
 + Le Grotenhuis
ATTORNEYS

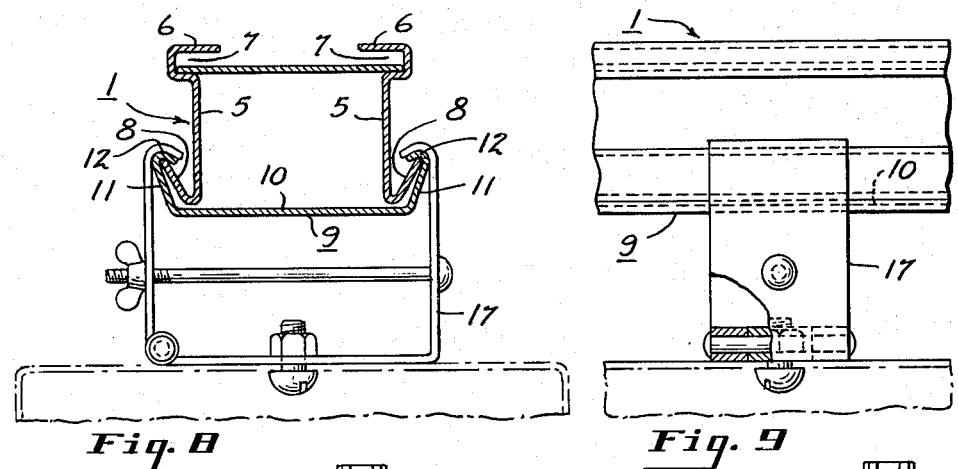
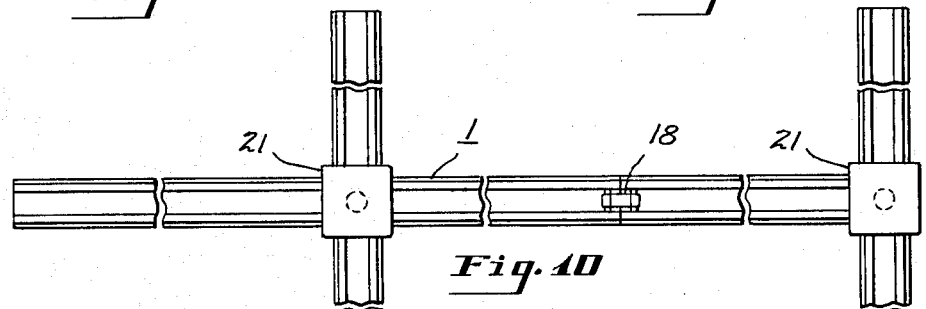
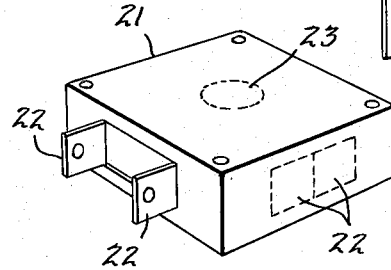
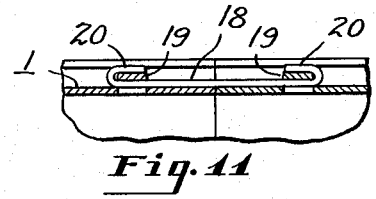
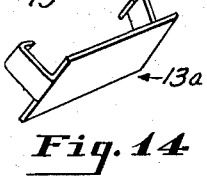

United States Patent Office 3,243,754
Patented Mar. 29, 1966

3,243,754
SUPPORTING AND FEEDING SYSTEM FOR PENDANT FLUORESCENT LIGHTING FIXTURES AND THE LIKE
Bert L. Miller, 5515 Oaks Road, Brecksville 41, Ohio
Filed Feb. 17, 1965, Ser. No. 433,297
3 Claims. (Cl. 339—22)

This invention relates to a system for supporting pendant lighting equipment such as fluorescent fixtures and the like, and for providing a conduit for carrying electrical conductors furnishing the power for the fixtures and for integral service outlets. More particularly, the invention relates to a novel apparatus formed of modular sections or units for mounting and feeding suspended lighting fixtures and for providing service outlets for electrical devices utilizing the electrical circuit of the lighting system.

Lighting systems designed for large working areas such as factories, supermarkets, large offices and the like generally utilize large fluorescent lighting fixtures which are either suspended from above or mounted directly to the surface of the ceiling. Such systems require considerable structural work within the space to be lighted in order to properly mount the fixture and provide proper connection to an electrical power source. Normally, each fixture must be separately mounted or suspended and separately wired into a central electrical circuit. This phase of construction is both time consuming and costly.

Also, when working areas such as in factories, office buildings and stores, etc. are modernized and the lighting converted from an old outdated lighting system to a new system of fluorescent lighting, it is necessary to make extensive structural modifications in order to adapt both the structural features and electrical wiring of the building to the new system. These modifications are made even more difficult by building codes in many municipalities which require that all electrical circuit elements within certain types of structures be housed in some suitable protective enclosure.

The present invention provides a novel and unique support system for pendant lighting fixtures which eliminates many of these problems and permits lighting systems to be rapidly and easily installed in almost any work area with a minimum of structural and electrical modification.

Briefly, the supporting system of the invention comprises modular sections or units which may be arranged and interconnected with one another to form any desired pattern. Each section includes an enclosed conduit for the current carrying circuit elements for distributing power to the lighting fixtures. The fixtures themselves are suspended from the sections by easily attached support brackets and spaced outlets are provided for connecting a line plug from the fixtures to the system. Also spaced service outlets may be provided in the sections to provide for the use of the lighting fixture circuit to operate accessory electrical equipment.

It is among the objects of the present invention to provide a pendant mounting apparatus for supporting and feeding lighting fixtures which is flexible, modular and which may be rapidly and easily installed with a minimum amount of electrical and structural modification within the space to be lighted.

It is also an object of the present invention to provide a versatile and flexible support system for lighting fixtures of any type which permits each fixture to be electrically connected directly to the system using conventional electrical plugs and sockets and which provides additional service outlets for other electrical apparatus which may use power from the electrical circuit for the lighting system.

Other objects, uses and advantages of the invention will become apparent by reference to the following detailed description taken in connection with the accompanying drawings, forming a part of the specification in which:

FIGURE 1 is a perspective view of a segment of a supporting and feeding system for pendant lighting fixtures showing a fluorescent lighting fixture in dashed lines suspended by the system;

FIGURE 2 is a fragmentary sectional view taken on the line 2—2 of FIGURE 1;

FIGURE 3 is a fragmentary side elevational view of the segment of FIGURE 1 with parts broken away and shown in section;

FIGURE 4 is a transverse sectional view taken on the line 4—4 of FIGURE 1 and showing the system being supported from above by suspension rods;

FIGURE 5 is a transverse sectional view of a load bearing channel of the system showing a method of attaching the system directly to a ceiling surface;

FIGURE 6 is a perspective view of an end plate to be attached to one end of a section of the apparatus;

FIGURE 7 is a perspective view of a hanger plate used to support the system;

FIGURE 8 is a transverse sectional view taken on the line 8—8 of FIGURE 1;

FIGURE 9 is a fragmentary side elevational view of the apparatus of FIGURE 1 with parts broken away and shown in section;

FIGURE 10 is a plan view showing modular segments interconnected to form a complete support system;

FIGURE 11 is a fragmentary longitudinal sectional view showing the method of joining two sections of the system end-to-end;

FIGURE 12 is a perspective view of a four-way junction member for interconnecting from two to four sections;

FIGURE 13 is a perspective view of two conductor raceways showing the rectangular openings provided in the bottom thereof for electrical sockets;

FIGURE 14 is a perspective view of a clip-on plate which may be clipped on the raceway over the openings where no outlet is desired.

FIGURES 1 to 14

Referring more particularly to the drawings, FIGURES 1 shows a portion of a pendant lighting system A embodying the present invention with a fluorescent lighting fixture B shown in dashed lines supported thereby. The system is composed of modular elements which are adapted for interconnection with one another to form any desired pattern for supporting the fixtures to accommodate the lighting requirements of the particular work space.

The portion of the system shown comprises elongated load bearing channels 1 attached together end-to-end and suspended from the ceiling by means of hanger rods 2 and hanger plates 3. The channels 1 include a cross plate 4 and side strips 5 which are fastened together by welding, brazing or other suitable means. The upper edges 6 of the side strips 5 are bent inwardly over the cross plate 4 to provide slots 7 for receiving the ends of the hanger plates 3 as best shown in FIGURES 4 and 5. The ends of the hanger plates 3 are preferably dimpled to provide a tight fit.

The lower ends 8 of the side strips 5 are bent outwardly and upwardly as best shown in FIGURES 4 and 5 to provide a connecting and supporting means for other members to be described below.

Supported by the load bearing channels 1 are conductor carrying raceways 9 having a floor 10 and sloping side walls 11. The upper ends of the side walls 11 are turned inwardly and downwardly to form flanges 12 adapted for mounting on the ends 8 of the channels 1 to provide a means for connecting the raceways 9 thereto. The raceways 9 may be of any desired length to meet the requirements of the particular lighting plan and together with the channels 1, form an enclosed conduit for carrying any desired number of electrical wires up to about 20 or 25. The raceways 9 are preferably staggered relative to the channels 1 so that the places where two sections of raceway abut will be spaced from the connections between adjoining sections of channel.

Formed in the floor 10 of the raceways 9 are rectangular openings 13, as best shown in FIGURE 13, to provide for spaced service outlets where desired for both lighting fixtures and other accessory electrical equipment which may be plugged into the electrical circuit. The openings 13 are adapted to receive an electrical socket 14 which is electrically connected to conductors located in the raceways 9 as best shown in FIGURES 2 and 3. The socket 14 is located to receive a line plug 15 attached to the electrical circuit of the lighting fixture B and hide the plug from view at the top of the fixture. A clip-on plate 13a of the type shown in FIGURE 14 may be attached to the raceways so as to cover the openings 13 where no outlet is to be located. An end plate 16 shown in FIGURE 6 may be attached at the termnial ends of the channels 1 to conceal the open end of the conduit formed by the members 1 and 9.

The lighting fixtures B may be mounted on the sections of the system A by means of mounting brackets 17 which have upwardly extending arms adapted to be fastened over the flanges 11 of the raceways 9. The fixtures are attached to the brackets 17 by means of bolts passing through the top of the fixture and through the bracket as best shown in FIGURES 8 and 9. One of the arms of the brackets 17 is hinged to permit the bracket to be easily attached to or detached from the support system members. When the brackets 17 are in position, they may be further secured by means of a bolt and thumb screw clamping together the arms thereof as best shown in FIGURE 8.

FIGURE 10 illustrates one type of assembly of the modular elements of the system to provide a desired lighting pattern in a work space. The channels 1 are connected end-to-end and fastened together with straps 18 which are securely received beneath upwardly extending stamped-out portions 19 in the top cover of the supporting member 1, as best shown in FIGURE 11. The ends 20 of the straps 18 are bent backward 180° to better secure the straps to the portions 19.

A junction box 21 may be used at the 90° intersection of two outwardly extending sections of the system as best shown in FIGURES 10 and 12. The junction boxes 21 are in the form of square metal boxes which have stamped cut-outs in their side walls to provide flaps 22 which may be bent outwardly with suitable tools, as shown in FIGURE 12, and fitted into the ends of the channels 1 and raceways 8. A stamped circular knock-out 23 may also be opened at the top of the junction box to provide access for conductors from the source of electrical power for the system.

*Assembly*

In a typical assembly of a lighting system utilizing the modular sections embodying the present invention, the hanger rods 2 are first installed so as to suspend the sections and lighting fixtures at a desired height. The rods should preferably be spaced about four feet apart. The hanger plates 3 are then attached to the ends of the hanger rods by means of the eyelets provided.

The sections of raceway 9 are then arranged end-to-end on the floor to provide a desired pattern in which they are to be installed. Next, the electrical sockets 14 are installed where desired in the openings 13 formed in the raceways 9. Electrical wires are laid in the raceways as needed and connected to the sockets 14. There should be at least one electrical outlet per four feet of raceway length in order to provide outlets for the lighting fixtures.

The channels 1 are positioned and attached by placing them end-to-end over the raceways with their points of connection preferably staggered from the places where the raceway sections abut. This facilitates the handling of long lengths of assembled sections during installation. The channels 1 are pressed downward on the raceways 9 to snap them into position as shown in FIGURES 4 and 5. The sections of channel 1 are then joined to one another at their adjoining ends by means of the straps 18, and the end plates 16 placed over the open ends of the raceways and channels. Junction boxes 21 are provided where needed, at least one of which serves as a service entry for the system.

The assembled system is then lifted up to the hanger plates 3 which are inserted and turned 90° so that the ends thereof are tightly received in the slots 7 as best shown in FIGURES 4 and 5. When a rather large system is to be installed, it is desirable to assemble small sections separately and lift them in place one at a time. Before raising the assembled sections into position, the hanger plates 3 should be rotated to a position where they will easily fit into the slots 7 in the top of the channels 1.

Finally, the lighting fixtures B are attached or suspended from the system by raising each fixture with the brackets 17 attached into position and placing the arms of the brackets 17 over the flanges 11 on the raceways as shown in FIGURES 8 and 9. The thumb screws on the bolts passing between the arms of the brackets 17 are then tightened to positively secure the brackets to the raceways. The fixtures B are then plugged into a convenient socket 14.

Once installed, individual sections of the system may be easily removed for repair or servicing without disrupting service in any other part of the installation. Also, installation of additional lighting units may be accomplished merely by adding appropriate branches where desired.

It is to be understood that, in accordance with the provisions of the patent statues, variations and modifications of the specific system and apparatus herein shown and described may be made without departing from the spirit of the invention.

Having thus described my invention, I claim:

1. Apparatus for suspending electrical fixtures comprising modular sections which include elongated interconnectable supporting members in the form of inverted channels with side walls having outwardly and upwardly bent lower ends forming continuous supports, conductor carrying channels having a floor and upwardly extending side walls, said side walls having inwardly and downwardly turned upper ends adapted to be received on said supports to form with said supporting members a tubular enclosure, electrical outlets located at spaced intervals in said sections communicating with said conductors; brackets attachable to said supports for suspending electrical fixtures from said sections; means for mounting said sections to a ceiling; said sections being interconnectable in endwise relationship to provide a conduit for insulated current carrying conductors and to form a composite system adapted to support a desired pattern of fixtures.

2. In combination, a pendant electrical lighting fixture and an apparatus comprising modular sections which include elongated interconnectable supporting members in the form of inverted channels with side walls having outwardly and upwardly bent lower ends forming supports, conductor carrying channels having a floor and upwardly extending side walls, said side walls having inwardly and downwardly turned upper ends adapted to be slidably received on said supports to form with said supporting members a tubular enclosure, electrical outlets located at spaced intervals in said sections communicating with said conductors for receiving a line plug from said fixture; brackets attachable to said supports at spaced locations for suspending said fixture from said sections; means for mounting said sections to a ceiling; said sections being interconnectable in endwise relationship to provide a conduit for insulated current carrying conductors.

3. Apparatus comprising a modular section which includes an elongated supporting member in the form of an inverted channel with side walls having outwardly and upwardly bent lower ends forming continuous supports, a conductor carrying channel having a floor and upwardly extending side walls, said side walls having inwardly and downwardly turned upper ends adapted to be received on said supports to form with said supporting member a tubular enclosure, an electrical outlet in said section communicating with said conductor; brackets attachable to said supports for mounting electrical fixtures on said section; and means for mounting said section on a structure.

References Cited by the Examiner

UNITED STATES PATENTS

| | | | |
|---|---|---|---|
| 1,217,398 | 2/1917 | Bonnell | 174—99 |
| 1,590,569 | 6/1926 | Fisk | 339—21 |
| 1,962,554 | 6/1934 | De Mask | 339—21 |
| 2,014,729 | 9/1935 | Frank et al. | 339—22 X |
| 2,105,833 | 1/1938 | Feuer et al. | 339—21 |
| 2,209,560 | 7/1940 | Carlson | 339—21 |
| 2,218,545 | 10/1940 | Morten | 339—21 |
| 2,306,353 | 12/1942 | Cole et al. | 339—22 |
| 2,626,301 | 1/1953 | Hammerly | 339—22 X |
| 2,968,782 | 1/1961 | Herrmann et al. | 339—22 |

FOREIGN PATENTS

| | | |
|---|---|---|
| 155,770 | 4/1952 | Australia. |
| 539,991 | 2/1956 | Italy. |
| 122,607 | 8/1948 | Sweden. |

JOSEPH D. SEERS, *Primary Examiner.*

PATRICK A. CLIFFORD, *Examiner.*